United States Patent
Greubel et al.

[11] 3,899,786
[45] Aug. 12, 1975

[54] LIQUID CRYSTAL COLOR DISPLAY SYSTEM

[75] Inventors: Waldemar Greubel; Hans Krueger; Ulrich Wolff, all of Munich, Germany

[73] Assignee: Siemens Aktiengesellschaft, Berlin & Munich, Germany

[22] Filed: May 16, 1973

[21] Appl. No.: 360,767

[30] Foreign Application Priority Data
June 2, 1972 Germany.......................... 2226959

[52] U.S. Cl............ 340/336; 340/380; 350/160 LC
[51] Int. Cl.................................................. G09f 9/32
[58] Field of Search............... 340/380, 336, 324 M; 350/160 LC

[56] References Cited
UNITED STATES PATENTS
3,499,702  3/1970  Goldmacher et al.......... 350/160 LC
3,576,563  4/1971  Scott et al........................... 340/380

*Primary Examiner*—Marshall M. Curtis
*Attorney, Agent, or Firm*—Hill, Gross, Simpson, Van Santen, Steadman, Chiara & Simpson

[57] ABSTRACT

Apparatus for originating and displaying color data utilizing liquid crystal which can be selectively energized to produce desired colors and patterns wherein in one embodiment the pattern is determined by electrical signals applied to the liquid crystal at particular locations thus giving a display at such locations and in a second embodiment wherein light conducting fibers are utilized to excite a display means connected to their output ends and wherein colored light is applied to the other end of the fibers by selectively energizing liquid crystals. In the first embodiment, a plurality of colored stripped electrodes are mounted adjacent a planar liquid crystal such that when electrical potential is applied between one of the colored stripped electrodes and second electrodes on the other side of the crystal, the particular energized colored stripped electrode becomes visible. In the second embodiment, three separate liquid crystal devices are provided each of which have electrode energizing strips of different colors which can be energized to produce the particular colors and which are connected to a display unit by light conducting fibers.

7 Claims, 3 Drawing Figures

LIQUID CRYSTAL COLOR DISPLAY SYSTEM

BACKGROUND OF THE INVENTION

1. Field of the Invention

This invention relates in general to display means for color data and in particular to apparatus which has at least three separable operable areas which produce different colors and include liquid crystals.

2. Description of the Prior Art.

Television type color display tubes utilize spot triplets consisting of three different luminescent materials which produce different colors which are scanned by three electron beams which excite the screen and dots through a perforated mask. The perforated mask has the same number of holes as there are triplets of fluorescent material, but a very precise adjustment is required to assure that each electron beam will precisely excite the individual dots associated with that beam so as to produce red, green and blue luminescent light. By varying the intensity of the excitation of the three guns any desired color value can be produced and by scanning a plurality of spot triplets color data will be produced and displayed.

A disadvantage of such system, however, exists due to the extreme accuracy of the physical adjustment required so as to assure that each of the three gun beams are exactly aligned with the associated color spots. For example, when a color image tube operates over a long period of time the perforated mask becomes heated and warped and so that the original alignment of the electron beams no longer exist and variations in the shades of color will result.

Also color image tubes are sensitive to vibrations and also require large space due to the long depth dimension of such tubes.

SUMMARY OF THE INVENTION

The present invention relates to a color data display device which also consists of image elements which are divided into at least three separately operable sections of different colors, but which does not have the disadvantages of the prior art mentioned above.

In the present invention each of the image elements is assigned a color liquid crystal display portion and the liquid crystal display elements are assembled to form one complete crystal screen comprising a layer of liquid crystal which is mounted between two transparent conductor paths formed on opposite surfaces of the liquid crystal container. So as to provide individual display elements having a colored appearance, the conductor paths of one conductor path system are colored and both conductor path layers and the liquid crystal layer are mounted between cross polarizers.

Parallel beams of white light which pass through the device are first linearly polarized by the first polarizer and then passed through a transparent carrier plate which has a first plurality of conductor paths arranged thereon and which are transparent, and then the liquid crystal layer and a second transparent carrier plate with color conductor paths arranged thereon and through which only a narrow frequency band of the white light passes which finally reaches the second polarizer which has a polarization plane which lies at right angles to that of the first polarizer. Electrical potentials are selectively applied to the first conductor paths and the color conductor paths such that at those locations of the liquid crystal layer where no electric field exists between the conductor paths, the polarization of the light is not influenced as it passes through the liquid crystal, and thus the second polarizer will not allow any light to pass through at those points. On the other hand if an electric field is applied to the liquid crystal layer by the first and second group of conductor paths the polarization state of the light will be disturbed as a function of the magnitude of the applied electric field thus resulting that a portion of the light as determined by the stength of the field will pass through the second polarizer and be visible.

A color display of data can be achieved with a single liquid crystal screen if the conductor paths on the second carrier plate consist of consecutively arranged narrow strips of different colors, and the colors may be varied as desired by selectively applying potentials to the narrow strips. On the other hand three liquid crystal screens can be utilized each of which have separate conductor paths of different colors and the output of these screens can be combined optically or otherwise so as to present color display. For example, in this structure light conducting filaments may be connected from the three liquid crystal screens having different colors to a separate picture screen with one light spot of each liquid crystal screen associated with an individual triplet on the picture screen which has three spots having three different colors.

An arrangement of the invention is very advantageous for production and operation in that in the event of necessary maintainance the coupling and/or replacement of the color cells can be accomplished externally of the picture screen. Also the image points can be made as small as desired and the physical dimensions of the device do not require any lengty dimension as in conventional color tubes of the present prior art devices.

Other objects, features, and advantages of the invention will be readily apparent from the following description of certain preferred embodiments thereof taken in conjunction with the accompanying drawings although variations and modifications may be effected without departing from the spirit and scope of the novel concepts and in which:

DESCRIPTION OF THE PREFERRED EMBODIMENTS

Figure 1:
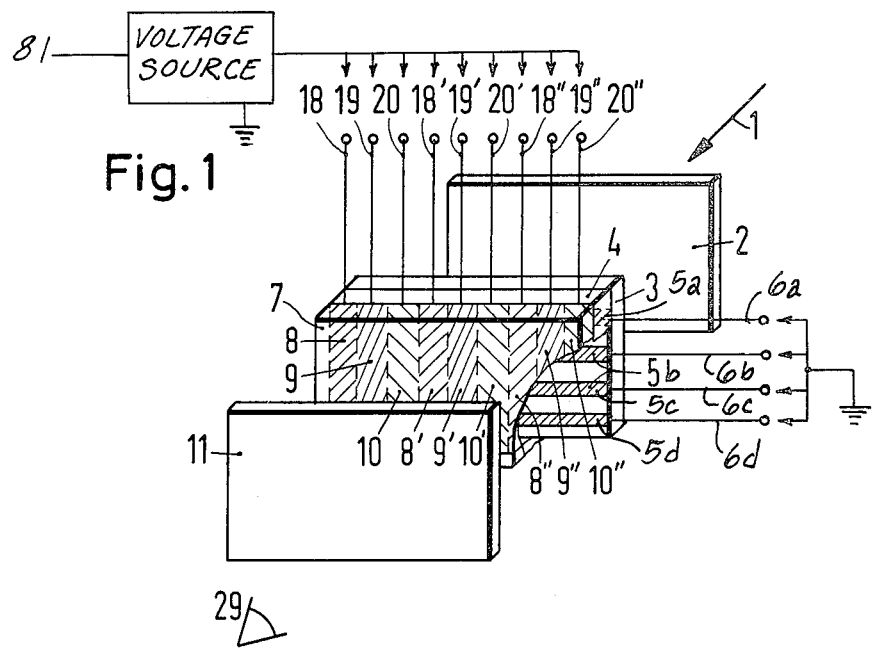
FIG. 1 is an exploded view illustrating a spatially uniform data display.

One form of the invention is illustrated in FIG. 1 which illustrate light rays 1 which pass through the invention to the eye 29 of the observer. The rays 1 first pass through a polarizer 2 which polarizes the light which passes therethrough in the vertical direction, for example. Thus the light which passes through the polarizer 2 is linearly polarized in the vertical direction. It then hits a transparent carrier plate 2 which carries a plurality of transparent horizontal electrical conductive strips 5a–5d which are respectively connected to electrical terminal 6a–bd. A liquid crystal layer 4 is mounted between the carrier plate 3 and a second carrier plate 7. The carrier plate 7 is also transparent and has a plurality of parallel transparent conductor strips mounted on its boundary surface to the liquid crystal layer 4, and these conductor strips 8, 9 and 10 are colored red, green and blue with the sequence of the colors being such that there is always the same color change in three consecutive color strips. For example, the strips 8, 8' and 8'' may be red. The strips 9, 9' and 9'' may be green, and the strips 10, 10' and 10'' may be blue. The conductor strips 8, 9 and 10 are each connected to supply leads 18, 19 and 20, and the strips 8', 9' and 10' are connected to supply leads 18', 19' and 20' and so forth which are selectively connectible to a voltage source 81 to supply a few volts of direct current voltage. Since the strips 8, 9 and 10 extend vertically of the plate 7 and the strips 5a–5d extend horizontally, a voltage will be applied between the conductor strips 5a–5d and 18, 19 and 20–18'', 19'' and 20'' when the strips 5a–5d are connected to ground and selected ones of the conductors 18, 19 and 20 are connected to the voltage source 81. In those regions of the device where a voltage potential is not present, the polarized light rays will not be influenced and the polarization will not be changed by the liquid crystal layer 4 and at those points the light rays will not pass through the horizontal polarizer 11.

On the other hand if a voltage is applied to selected ones of the leads 18, 19 and 20 – 18'', 19'' and 20'' and selected ones of the strips 5a–5d are grounded, the polarization state in the liquid crystal will be disturbed in those areas with the magnitude of the applied voltage determining the amount of the disturbance of the polarization of the light from the vertical polarization, and some of the light components will pass through the horizontal filter 11. Thus by selectively connecting the vertical strips 8, 9 and 10 to the voltage source 81 both the color and position of light display can be controlled. Since the conductor strips 8, 9 and 10 are very narrow and colored, the observer 29 standing at some distance in front of the polarizer 11 will see a color pattern which arises by additive color mixing of the three juxtaposed color strips 8, 9 and 10. Both the color and position of the indication can be controlled by selectively connecting voltages to the leads 18, 19 and 20 – 18'', 19'' and 20'' and be selectively grounding the horizontal strips 5a–5d.

Figure 2:
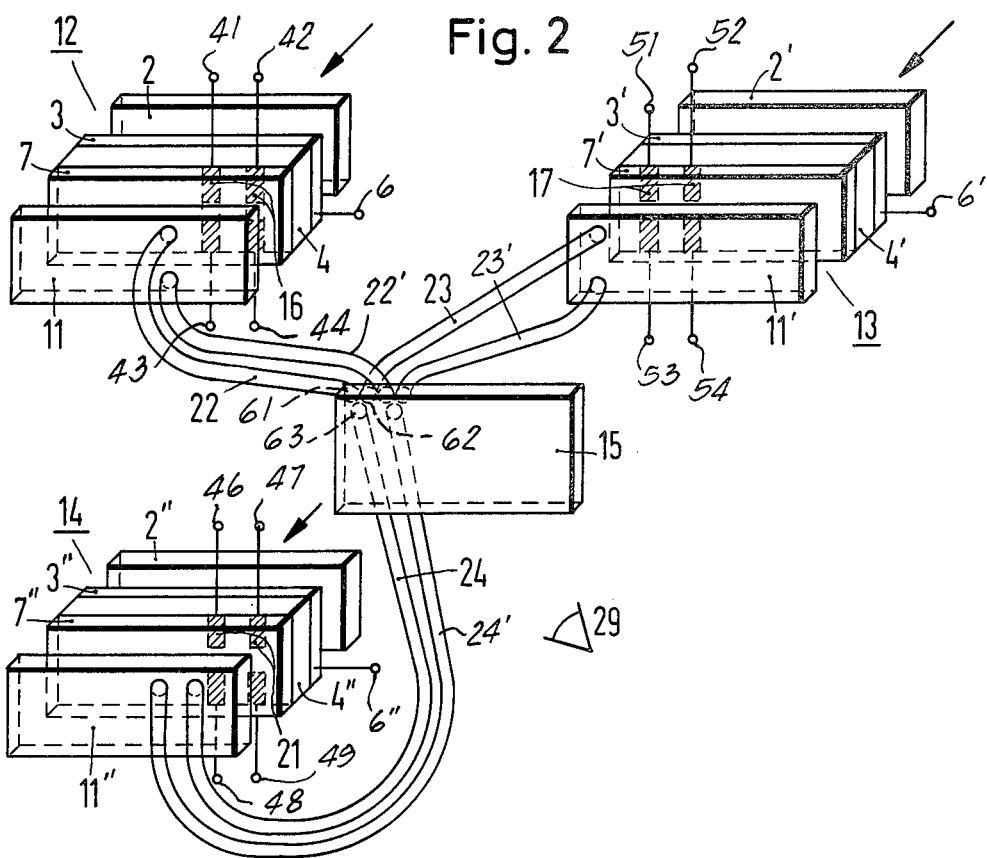
FIG. 2 is a color display system of the invention consisting of three liquid crystal screens and a separate picture screen.

FIG. 2 illustrates a modification of the invention wherein three separate display color cells 12, 13 and 14 are provided, each of which are associated with a single color and wherein their outputs are supplied to a screen 15 by light transmitting filaments.

Each of the display cells 12, 13 and 14 respectively include cross polarizers 2 and 11, 2'' and 11' and 2'' and 11''. These cross polarizers are similar to the cross polarizers 2 and 11 in FIG. 1. Between the cross polarizers are mounted a pair of carrier plates 3 and 7 and a liquid crystal layer 4 in display cell 12. In display cell 13 carrier plates 3' and 7' are provided between which is mounted liquid crystal 4'. In display cell 14 carrier plates 3'' and 7'' are mounted on either side of the liquid crystal layer 4''.

Between the carrier plates 3 and the liquid crystal 4 and the carrier plate 3' and the crystal 4' and the carrier plate 4'' and liquid crystal 4'' are provided transparent conductor layers which are respectively connected to electrical contacts 6, 6' and 6''.

On the carrier plates 7, 7' and 7'' which border on the liquid layers 4, 4' and 4'' are respectively mounted a plurality of conductor strips. The conductor strips on cell 12 are numbered 16 and may be red. The conductor strips on cell 13 may be blue, and the conductor strips 21 on display cell 14 are green. Electrical contacts 41, 42 and 43 and 44 are respectively connected to different strips 16 in cell 12. Electrical contacts 51, 52, 53 and 54 are connected to different strip 17 in cell 13, and electrical contacts 46, 47, 48 and 49 are connected to different strips 21 in cell 14. Thus in a fashion similar to the operation of FIG. 1 the cell 12 may be caused to produce red regions when a voltage exists between a particular strip 16 and the conductive layer to which contact 6 is connected. Likewise regions of cell 13 may be selectively made to illustrate blue and regions 14 may be adapted to illustrate green. Thus in a manner similar to the operation of the structure FIG. 1 the light cell units 12, 13 and 14 can be made to selectively produce red, blue or green light in different units. A viewing screen 15 can be seen by the observer 29 and a plurality of light conducting filaments are respectively connected from each of the cells 12, 13 and 14 to the picture screen 15, such that by selectively illuminating different filaments associated with different positions on the viewing screen 15, different colors and different pictures can be presented to an observer. For example, the cell 12 has illustrated a pair of light conducting filaments 22 and 22' which are associated with different areas of the cell 12 so as to selectively produce red light when desired. Likewise the cell 13 has a plurality of filaments illustrated by the filaments 23 and 23' associated with different regions of the cell 13 for presenting blue light on the screen 15. Light filaments 24 and 24' are associated with different regions of the cell 14. The ends of the filaments 22, 23 and 24 are arranged in triads so that the ends 61, 62 and 63 of the filaments 22, 23 and 24 form a triad and any desired color can be presented by combining different colors and different brightness values of the outputs of the cells 12, 13 and 14. The light conducting filaments 22', 23' and 24' form a second triad as illustrated in FIG. 2. It is to be realized of course the many triads would be formed on the picture screen 15 and many light filaments would be provided which can be selectively varied in output and intensity so as to present the desired picture on the screen 15.

Figure 3:
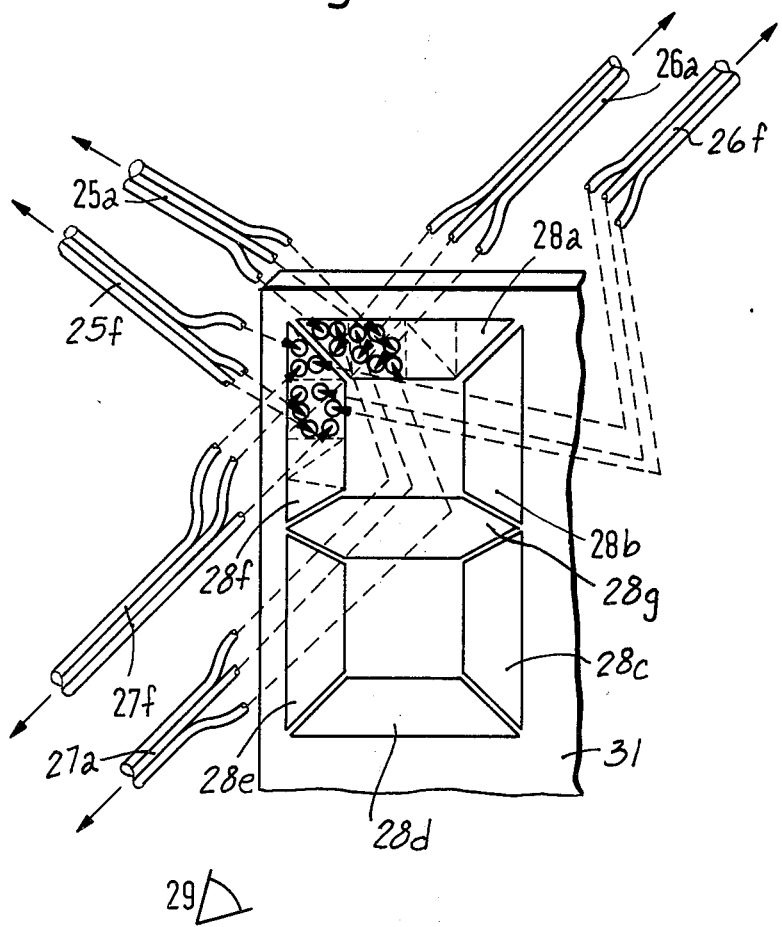
FIG. 3 is an enlarged detailed view illustrating a sevensegment color display.

A further embodiment of the invention as illustrated in FIG. 3 which comprises a seven element indicator for indicating digits. For example, a background plate 31 carries seven segments 28a–28g and light conducting filaments 25, 26 and 27 extend from light cells such as cells 12, 13 and 14 illustrated in FIG. 2 so as to produce desired numeric output. For example, light filaments 25a extend from red light cell 12 to element 28a and form the red dots of the various triads in segment 28a. Likewise light filaments 26a extend from the blue light cell 13 to the segment 28a and light filaments 27a extend from the green light cell 14 to form the triads of segment 28a. Thus in a particular numeral wherein the segment 28a is to be lighted, the filaments 25a, 26a and 27a will be illuminated to illuminate the segment 28a of the display unit. Other light filaments from each of the light cells are respectively connected to each of the other six indicator segments 28b–28g to selectively illuminate them as required. For example, segment 28f is arranged to receive light filaments 25f, 26f and 27f from the light cells 12, 13 and 14.

It is to be realized, of course, that with the light cells 12, 13 and 14 in particular areas can be illuminated such that each of the segments 28a–28g can be individually or simultaneously illuminated so as to present the digits 0–9 on the indicator of FIG. 3.

It is seen that this invention provides means for presenting information in color in a new and novel way and although it has been described with respect to preferred embodiments it is not to be so limited as changes and modifications may be effected which are within the full intended scope as defined by the appended claims.

We claim:

1. In an apparatus for presenting colored images comprising:
   a first light polarizing means,
   a second light polarizing means,
   a liquid crystal means mounted between first and second polarizing means,
   electrode energizing means,
   a plurality of transparent electrodes suitably mounted adjacent said crystal means such that said electrode energizing means produces a field across said liquid crystal wherein the improvement comprises an addition of at least one pigment to the transparent electrode material whereby a colored image may be selectively derived.

2. In an apparatus for presenting colored images according to claim 1 wherein said electrodes are divided into a plurality of interleaved groups and said pigments for each group are different.

3. In an apparatus for presenting colored images according to claim 1 wherein said electrodes are divided into groups each corresponding to a discrete area on the device and further including a display means and fiber optic means connecting said discrete areas to said display means.

4. In an apparatus for presenting colored images according to claim 3 wherein said groups comprise discrete devices.

5. In an apparatus for presenting colored images according to claim 4 wherein said fiber optic means terminate in a plurality of triads arranged over an area of said display means to produce a display.

6. In an apparatus according to claim 2 wherein said plurality of transparent electrodes are strip shaped and arranged parallel to each other and a second plurality of strip shaped electrodes connected to said electrode energizing means and arranged parallel to each other and extending at right angles to said pluraltiy of transparent electrodes of said liquid crystal means mounted between said plurality of transparent electrodes and said second plurality of electrodes.

7. In an apparatus according to claim 5 wherein said display means comprises an alphanumeric display having seven segments and the area over which said plurality of triads are arranged includes said seven segments.

* * * * *